J. B. POLO.
ALARM.
APPLICATION FILED FEB. 28, 1914.
1,132,793.
Patented Mar. 23, 1915.
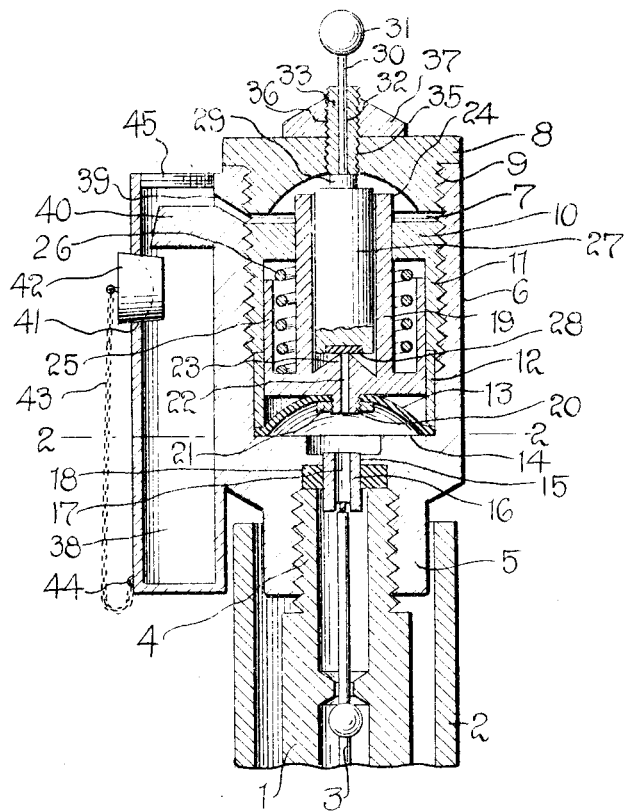
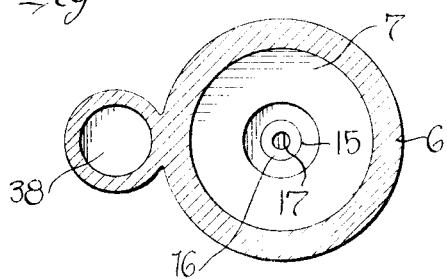
Witnesses
Robert M. Sutphen
A. L. Hind
Inventor
J. B. Polo
By Watson E. Coleman
Attorney

UNITED STATES PATENT OFFICE.

JOSEPH B. POLO, OF CLEAR LAKE, SOUTH DAKOTA.

ALARM.

1,132,793.   Specification of Letters Patent.   Patented Mar. 23, 1915.

Application filed February 28, 1914. Serial No. 821,721.

*To all whom it may concern:*

Be it known that I, JOSEPH B. POLO, a citizen of the United States, residing at Clear Lake, in the county of Deuel and State of South Dakota, have invented certain new and useful Improvements in Alarms, of which the following is a specification, reference being had to the accompanying drawings.

This invention comprehends certain new and useful improvements in alarms, and relates specifically to improvements upon the form of alarm covered by my pending application, Serial No. 740,249, and has for its primary object to provide a pneumatic tire alarm which will be automatic, as well as highly efficient in operation.

Another object of the invention is to provide an alarm of this character which may be readily regulated to give an audible signal when the air pressure within the tire to which the device is connected, decreases a predetermined extent.

A further object is to provide an alarm of this character which may be readily adjusted after giving a signal to give a second signal upon further decrease of the air pressure within the tire.

A still further object is to generally improve and simplify the construction and operation of devices of this character and construct the same of the minimum number of parts of simple formation.

With the above and other objects in view, my invention consists in certain novel constructions, combinations, and arrangements of parts to be hereinafter more fully described, claimed, and illustrated in the accompanying drawings, in which, Figure 1 is a sectional view taken through a device constructed in accordance with my invention, a portion of the co-acting tire valve and a protecting sleeve being also shown in section; and Fig. 2 is a sectional view taken substantially on the line 2—2 of Fig. 1.

Referring more specifically to the drawings in which similar reference characters designate corresponding parts throughout the several views, 1 designates a valve stem of the ordinary form employed in connection with pneumatic tires and surrounded by a protecting sleeve 2 which may be secured to the wheel felly (not shown), in any suitable manner. Within the valve stem 1 is located the ordinary check valve 3 and it will be noted that the free extremity 4 of the valve stem is reduced and threaded. Engaged upon the threaded reduced extremity 4 of the valve stem 1, is the inner end 5 of the casing 6, the protecting sleeve 2 surrounding and protecting the connected ends of the valve stem and casing.

The casing 6 has a chamber 7 in its main portion and the outer end of the chamber is closed by the cap 8 threaded in the outer end of said casing. The outer portion of the chamber 7 is interiorly threaded, as shown at 9, and a nut 10 is engaged with said interiorly threaded portion of the chamber and has a reduced sleeve portion 11 bearing against the smooth sleeve 12 which serves to clamp the circular edge of the rubber diaphragm 13 against the inner wall 14 of the chamber 7.

The reduced threaded inner end 5 of the casing communicates with the chamber 7 by means of the central opening 15 in the inner end wall 14 of said chamber, within which opening is engaged the stop member 16 having a central passage 17 and secured centrally in the washer 18 formed of lead, red fiber or other suitable material and secured in the inner end 5 of the casing, at the inner ends of the interior threads thereof. When the device is in position upon the valve stem, the stop member 16 is engaged against the stem of the valve 3 and retains said valve in open position.

Positioned above the rubber diaphragm 13 is the sliding thimble 19 which has a depending neck portion 20 which is extended through the center of the diaphragm and exteriorly threaded, whereby the nut 21 is secured thereon, beneath the diaphragm, thereby clamping the central portion of said diaphragm to the lower head of the thimble. It will be understood that the head of the thimble and neck are provided with a central opening 22, whereby air beneath the diaphragm may enter the thimble, as will be later clearly apparent. The head of the thimble is increased in thickness at its central portion by directing upwardly the inner wall thereof to form the valve seat 23. It will be understood that the lower face of the head of the thimble is flat and extended beyond the circular body portion 24 of said thimble, which circular body portion is slidably engaged through the main portion of the nut 10. The thimble is provided with an outer circular flange 25 projecting upwardly from the outer circular edge of the head and slidably engaged against the inner faces of the smooth sleeve 12 and the reduced sleeve portion 11 of the nut 10. Between the circular body portion 24 of the thimble and the circular flange 25, is positioned a helical spring 26 which has one end bearing against the head of the thimble while the opposite end of said spring bears against the lower face of the main portion of said nut 10 and serves to resiliently retain the thimble in its lowermost or innermost position.

Within the body 24 of the thimble 19 and capable of endwise movement therein is the valve member 27 provided at its inner or lower end with a compressible block 28, preferably formed of rubber, adapted to be normally engaged with the valve seat 23 and thus effectually close the opening 22 as is believed to be self-evident. The opposite or adjacent end of the valve member 27 is adapted to be engaged by the head or enlargement 29 produced on the inner extremity of the rod 30 whereby movement of the valve member 27 may be imparted in one direction, as will hereinafter be self-evident. The rod 30 is directed through the bore 32 of the exteriorly threaded sleeve 33 which has adjustable engagement with the alined openings 35 and 36 of the cap 8 and lock nut 37, respectively. While the rod 30 is adapted to have free recurrent movement through the sleeve 33, it is to be observed that the relative transverse diameters of the rod 30 and the bore 32 are such as to afford frictional engagement between the rod 30 and the sleeve 33 whereby a certain degree of resistance is offered to the endwise movement of the rod 30. As is thought to be obvious, the rod 30 is adapted to be manipulated manually and for convenience of said operation its outer or exterior extremity, as herein disclosed, is provided with a knob 31 of conventional form.

Normally the parts of my device are in the position as illustrated in Fig. 1 of the accompanying drawings, the pressure of the air within the tire serving to overcome the influence of the spring 26. Should the pressure of the air within the tire decrease from any cause, such as a puncture, to a resistive power less than the tension of the spring 26, the thimble 19 or particularly the valve seat 23 thereof, will be forced away from the valve member 27 whereupon the air from within the tire will enter the body portion 24 of the thimble 19, pass the valve member 27 and escape from the upper or outer end of the body portion 24 within the chamber 7 above or outwardly of the nut 10. The air will then pass from the chamber 7 into the cylinder 38 through the by-pass 39 and pass the lip 40 and escape to the atmosphere through the vent 41 into the wall of the cylinder in close proximity to the lip 40, it being understood that the force of the air is sufficient to blow out the plug 42 positioned in said vent 41, as is clearly shown in Fig. 1. The plug 42 has connected therewith a chain 43 which is also secured as at 44, to the exterior of the cylinder 38, thereby eliminating all possibility of the plug 42 becoming lost when forced out of operative position. The passage of the air by the lip 40 and through the opening 41 results in a whistling sound as is believed to be obvious. As soon as the signal afforded by the whistle is heard, the rod 30 may then be operated to move the valve member in the thimble 19, so that the block 28 carried thereby properly engages the valve seat 23, thereby preventing a continuance of the signal until there is a further decrease of the air pressure within the tire sufficient to allow the helical spring 26 to again overcome said pressure whereupon the operation hereinbefore set forth will be repeated.

As is thought to be obvious, the pressure of the air within the tire after the first signal has been given is insufficient to force the valve member 27 and the rod 30 upwardly or outwardly to permit said air to operate owing to the frictional engagement of the rod 30 and the bore 32 of the sleeve 33. As herein disclosed, the sleeve 33 may be readily adjusted and maintained in such adjusted position through the medium of the lock nut 37, such adjustment of the sleeve serving to adjust the normal position of the head or enlargement 29 of the rod 30, thereby regulating the initial operation of the device.

It will further be understood that should it be desired to remove the alarm after the sounding of the initial signal in order to prevent all of the air from escaping from the tire through the alarm, the device may be readily removed while exerting pressure upon the rod 30 and thereby preventing disengagement of the valve 27 from the valve seat 23.

As herein disclosed, one end of the cylinder 38 is open and adapted to be closed by the cap 45. This, however is not essential, but has been found preferable in the construction of the device.

From the foregoing description, it is thought to be obvious that an alarm constructed in accordance with an embodiment of my invention is of an extremely simple and comparatively inexpensive nature and is particularly well adapted for use by reason of the convenience and facility with which it may be assembled and applied in operative position, and it will also be obvious from the foregoing description, that my alarm is susceptible of some change and modification without material departure from the principles and spirit thereof and for this reason I do not wish to be understood as limiting myself to the precise arrangement and formation of the several parts shown in carrying my invention in practice.

What is claimed is:—

1. A device of the class described comprising the combination with a valve stem and valve positioned therein, of a casing mounted upon said valve stem, means carried by the casing for retaining the valve in open position to allow air from the valve stem to enter the casing, a diaphragm within said casing, means carried by the diaphragm for reciprocating movement in said casing, said means having an opening whereby air within said casing may enter said means, a substantially stationary valve member within said means for preventing escape of air from said means when the latter is in normal position, signal mechanism carried by said casing, and means engaged with the second mentioned means for moving the latter longitudinally of the casing to permit air to pass the valve member and cause operation of the signal mechanism upon decrease of the air pressure within the valve stem and casing.

2. A device of the class described comprising a casing adapted to be secured to a valve stem, means carried by the casing for retaining the valve in the valve stem in open position, a thimble within said casing, a diaphragm within said casing, means for securing the diaphragm in position, said thimble being connected with the diaphragm and adapted to be moved thereby in one direction, a substantially stationary valve member within said thimble, said thimble having an air inlet opening, a cylinder carried by said casing, an air passage connecting the interior of the cylinder with the interior of the casing, a lip within said cylinder adjacent said air passage, said cylinder being provided with an air passage, said cylinder being provided with an air escape opening adjacent said lip, the air pressure from the valve stem pressing against one face of the diaphragm and serving to retain the latter and the thimble in normal position, and means engaged with the thimble for forcing said thimble and diaphragm toward one end of the casing to permit the air to pass the valve member and travel into the cylinder and pass the lip to the atmosphere to give an audible signal upon decrease of the air pressure.

3. A device of the class described comprising a casing, a diaphragm within said casing, said casing having one end open to permit air to enter said casing and operate upon one face of the diaphragm to retain the same in normal position, means for securing the edge of the diaphragm against movement, a thimble secured to said diaphragm, said thimble having a circular flange surrounding its body portion and spaced from the same, a nut within said casing, the body portion of said thimble being slidably engaged through said nut, a valve member within said thimble, said thimble having an air inlet opening, valve means within the thimble for engagement against the air inlet opening when said thimble is in normal position, said valve means serving to close the end of the thimble and prevent air from escaping from said thimble when the latter is in normal position, a cylinder connected with said casing, said cylinder having an air escape opening, a lip adjacent said air escape opening, and means between the body portion and circular flange of the thimble to cause movement of said thimble and diaphragm in one direction to permit the air to pass the valve means and lip to give an audible signal upon decrease of the air pressure against the diaphragm.

4. A device of the character described comprising a casing having a chamber in its main portion, means for closing the outer end of said casing, the inner end of said casing being reduced and adapted for engagement with a valve stem, means within said reduced inner end of the casing to retain the valve in the valve stem in open position, a diaphragm within the chamber, a thimble within said chamber and connected with the diaphragm, and provided with an opening to afford communication with the chamber at the opposite side of the diaphragm, means for guiding the thimble longitudinally of the chamber, a substantially stationary valve member within said thimble, said casing having an air escape opening, a lip adjacent said air escape opening, and means for forcing the thimble and diaphragm in one direction upon decrease of the air pressure against said diaphragm, said valve member being of a transverse diameter less than the similar diameter of the bore of the thimble.

In testimony whereof I hereunto affix my signature in the presence of two witnesses.

JOSEPH B. POLO.

Witnesses:
E. E. WALSETH,
J. E. WALSETH.